(12) United States Patent
Le et al.

(10) Patent No.: US 9,912,137 B2
(45) Date of Patent: Mar. 6, 2018

(54) METHODS FOR DIVERTING LIGHTNING CURRENT FROM SKIN FASTENERS IN COMPOSITE, NON-METALLIC STRUCTURES

(71) Applicant: The Boeing Company, Chicago, IL (US)

(72) Inventors: Quynhgiao Le, Bellevue, WA (US); Jeffrey Denys Morgan, Auburn, WA (US); Robert B. Greegor, Black Diamond, WA (US); Brent A. Whiting, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 14/875,297

(22) Filed: Oct. 5, 2015

(65) Prior Publication Data

US 2017/0098930 A1    Apr. 6, 2017

(51) Int. Cl.
| | |
|---|---|
| *B64D 45/02* | (2006.01) |
| *F16B 37/14* | (2006.01) |
| *B64C 1/12* | (2006.01) |
| *B64D 37/32* | (2006.01) |
| *H02G 13/00* | (2006.01) |
| *B29C 70/54* | (2006.01) |
| *B29C 70/88* | (2006.01) |

(52) U.S. Cl.
CPC ........... *H02G 13/80* (2013.01); *B29C 70/545* (2013.01); *B29C 70/882* (2013.01); *B64D 45/02* (2013.01); *Y02T 50/433* (2013.01)

(58) Field of Classification Search
CPC ...... H02G 13/80; H29C 70/882; B64D 45/02; B64D 37/32; F16B 33/004; F16B 37/14; B64C 1/12
USPC .......................................................... 361/218
See application file for complete search history.

(56) References Cited

U.S. PATENT DOCUMENTS

| | | | |
|---|---|---|---|
| 3,755,713 | A | 8/1973 | Paszkowski |
| 7,969,706 | B2 | 6/2011 | Heeter et al. |
| 2004/0246651 | A1 | 12/2004 | De La Fuente de Ana |
| 2009/0258220 | A1 | 10/2009 | Olsen et al. |
| 2010/0263898 | A1* | 10/2010 | Hebert ...................... B64C 1/12 174/2 |

(Continued)

FOREIGN PATENT DOCUMENTS

FR         2765066 A    12/1998

*Primary Examiner* — Dharti Patel
(74) *Attorney, Agent, or Firm* — Felix L. Fischer

(57) ABSTRACT

A multilayer composite structure with integrated fastener-to-conductive layer surface lightning protection interconnection employs a conductive layer with an inner surface and a plurality of chamfered recesses forming countersinks in an outer surface. A carbon-fiber reinforced plastic (CFRP) composite layer is disposed on the inner surface of the conductive layer and conforms to the surface shape. A plurality of holes extend through the plurality of chamfered recesses in the conductive layer and the adjoining CFRP composite layer in a manner such that the conductive layer defines a countersink portion extending into the openings of the plurality of holes. The chamfered recesses in the conductive layer provides an electrically conductive surface area that contacts conductive countersunk fasteners installed within the plurality of holes to enable current sharing between groups of neighboring fasteners.

18 Claims, 6 Drawing Sheets

(56) References Cited

U.S. PATENT DOCUMENTS

2010/0320315 A1* 12/2010 Kashiwagi ............. B64D 45/02
   244/1 A
2011/0174536 A1   7/2011 Wilson et al.
2011/0186206 A1* 8/2011 Ackerman ............. B32B 38/10
   156/98

* cited by examiner

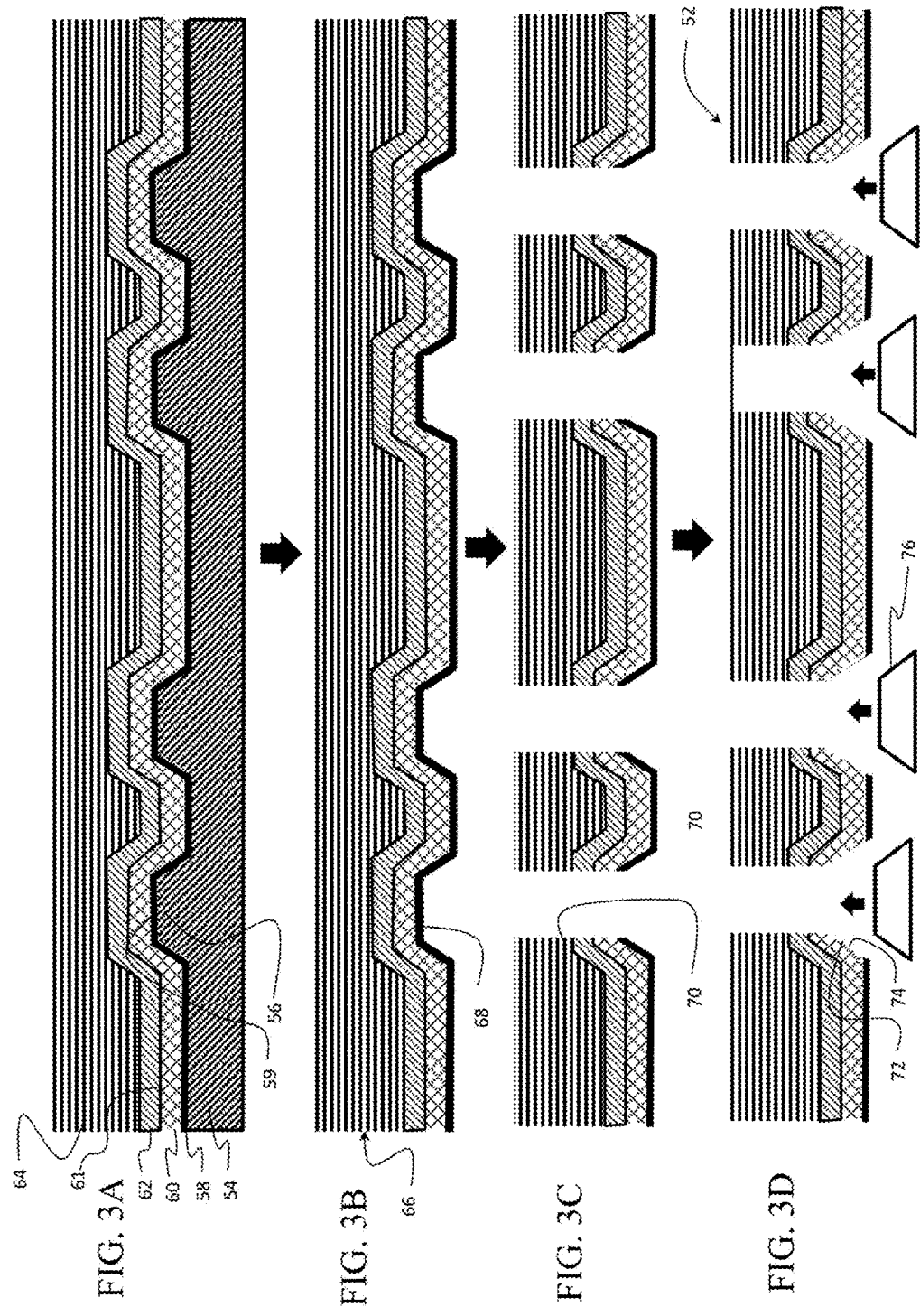

METHODS FOR DIVERTING LIGHTNING CURRENT FROM SKIN FASTENERS IN COMPOSITE, NON-METALLIC STRUCTURES

BACKGROUND INFORMATION

Field

Embodiments of the disclosure relate generally to the field of lightning protection of non-metallic structures and more particularly to lightning protection of aerospace structures fabricated from carbon fiber reinforced plastic (CFRP) composite systems.

Background

Lightning protection is a requirement for all aircraft, particularly aircraft with composite structures. Due to its high strength to weight ratio, carbon fiber reinforced plastic (CFRP) material systems are increasingly used for aerospace structures. However, since carbon fiber is 2000 times more resistive than aluminum and is embedded in a matrix that typically consists of 35-40 weight % non-conductive contents, damage from direct lightning strikes to the CFRP structures is more severe and efforts to protect the CFRP structures from lightning direct attachment have required significant attention to ensure continued airworthiness of the design. Metallic skin fasteners, particularly fasteners in composite/non-metallic wing skins, require special attention as they are more susceptible to direct lightning attachment, if unprotected, and may lead to fuel tank ignition. Common approaches for lightning protection of fastened joints in the aerospace industry include minimizing lightning current entering the fastened joints, increasing the current carrying capacity of the fastened joints, containing energy released from the fastened joints, or some combination of these approaches. Various methods and technologies have been successfully implemented with proven lightning protection performance effectiveness. However, due to their complexity, these methods have often resulted in either high part costs, high manufacturing costs or high maintenance costs.

It is therefore desirable to provide less complex methods and designs for fastened joints in CFRP structures which maintain acceptable lightning protection at reduced costs.

SUMMARY

Embodiments disclosed herein provide a multilayer composite structure with integrated fastener-to-conductive layer surface lightning protection interconnections having a co-cured conductive layer, such as a wire mesh, with an inner surface and a plurality of chamfered recesses forming part of countersinks in an outer surface. One or more carbon-fiber reinforced plastic (CFRP) composite layers are disposed on the inner surface of the co-cured conductive layer and conforms to the surface shape. A plurality of holes extend through the plurality of chamfered recesses in the co-cured conductive layer and the adjoining CFRP composite layer in a manner such that the co-cured conductive layer defines a countersink portion extending into the openings of the plurality of holes. The chamfered recesses in the co-cured conductive layer increase an electrically conductive surface area that contacts conductive, metallic countersunk fasteners installed within the plurality of holes.

A feature of one embodiment includes a carbon fiber reinforced plastic (CFRP) composite structure having a hole with a countersink and a conical washer inserted in the countersink. A fastener received with a clearance fit in the hole has a conical head conductively engaging the conical washer whereby any lightning current attaching to or conducting through the head of the fastener is dissipated in a discharge path primarily through the composite layers in an outer portion of the composite structure extending adjacent from the fastener head.

The embodiments disclosed may be fabricated using a method of forming a multilayer composite structure with integrated fastener-to-conductive layer surface lightning protection interconnections. A glass fiber reinforced pre-impregnated layer or surfacing film is laid over a tool having a plurality of raised conical-shaped features. A conductive surface protection layer is then laid over the fiber glass or surfacing film layer to form a plurality of chamfered recesses in the co-cured conductive layer. Carbon-fiber reinforced plastic (CFRP) composite layers are then laid over the fiber glass or surfacing film layer and the conductive layer. The entire layup is then co-cured on the tool. Following cure and removal from the layup tool, a plurality of holes are machined through the plurality of recesses in the conductive layer and the adjoining composite layer in a manner such that the chamfered recesses expose the conductive layer surface and define the finished countersink dimensions. Fasteners are then inserted into the plurality of holes such that the chamfered recesses in the countersinks with the conductive layer provide the electrical connection to the countersunk heads of the metallic fasteners installed within the plurality of holes.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 3A-3D show in section view an exemplary composite layup flow for a composite structural panel employing an embodiment with embedded wire mesh, as an example of a conductive surface protection layer, and optional conical contact washers;

DETAILED DESCRIPTION

Embodiments disclosed herein provide lightning and/or other forms of electrical current dissipation in a first embodiment through electrical contact between a conical washer and outer layers of a composite structure and a conical head of a fastener extending through the composite structure. A shaft of the fastener is received in the composite structure in a clearance fit hole. In a further embodiment, current dissipation is enhanced through direct electrical connection between a conductive layer co-cured in a composite structure and fasteners in the composite structure. The co-cured conductive layer extends inside a portion of the fastener holes and makes contact with heads of the fasteners or a conical washer interfacing the fastener head into the countersink after installation. The composite structure is realized by first laying down a fiber glass or surfacing film as a protective outer layer, a conductive layer such as a wire mesh, an adhesive layer (which may be integrated with the conductive layer or applied to the conductive layer prior to layup), followed by the subsequent CFRP tape layers in accordance with the structural design on a uniquely designed laminating tool with raised features. These raised features are designed to provide part of the countersink holes (typical angle of 100 degrees) for the skin fasteners that will be installed later. After curing, the laminated skin is then removed from the laminating tool, then drilled at the location of the raised features and appropriately finished to provide the countersink holes for fastener installation. Countersinking of the holes at the location of the raised features removes only the fiber glass or surfacing film outer layer on the angled surfaces of the formed indentations. In addition, to further increase the current carrying capacity of the joint, conical washers of a desired metal type having a density and thickness (as required by the design, to be discussed subsequently) may be added to the countersink hole to form electrical contacts with both the portion in the countersink holes with the conductive layer and the fastener heads. This approach allows the fasteners to make direct electrical contact either directly with the co-cured conductive layer or with the added conical washers that are in contact with the co-cured conductive layer at the countersink angled surface where lightning current transfer may occur to improve the current carrying capacity of the joint, thus negating the need for current transfer through sleeved, interference fit joints. This allows for the replacement of expensive sleeved fasteners with clearance fit fasteners, thus lowering the cost of airplane production. Clearance fit fastened joints also significantly facilitate fastener installation, and will result in reduced assembly labor and flow time.

Figure 1:
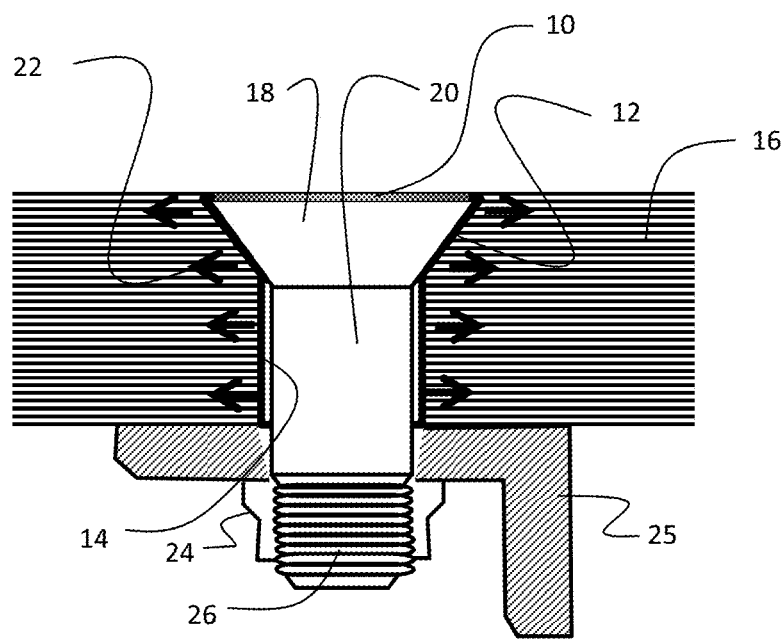
FIG. 1 is a section view of a prior art fastener system employing a sleeve with an interference fit at the head and shaft of a fastener.

Referring to the drawings, FIG. 1 shows an exemplary prior art fastener installation in which a fastener 10 is received with an interference fit (fit spacing is exaggerated in the drawing for clarity of the elements) by a sleeve 12 inserted in a countersunk hole 14 in a multilayer composite structure 16 such as a CFRP skin. Fastener head 18 and fastener shaft 20 are both in electrical contact with the sleeve 12 which, in turn is in electrical contact with the composite structure 16. Lightning current attaching to or conducting through the head 18 of the fastener is dissipated into the composite structure throughout the length of the fastener head and shaft as indicated by arrows 22. In this example the fastener 10 is secured with a nut/collar 24 received on a threaded end 26 to secure the composite structure to another structural member 25. This discharge path results in uniform current distribution through layers in the composite structure, such as the example skin layup and higher current density at fastener collar/nut may result in enhanced fuel tank sealing requirements.

Figure 2:
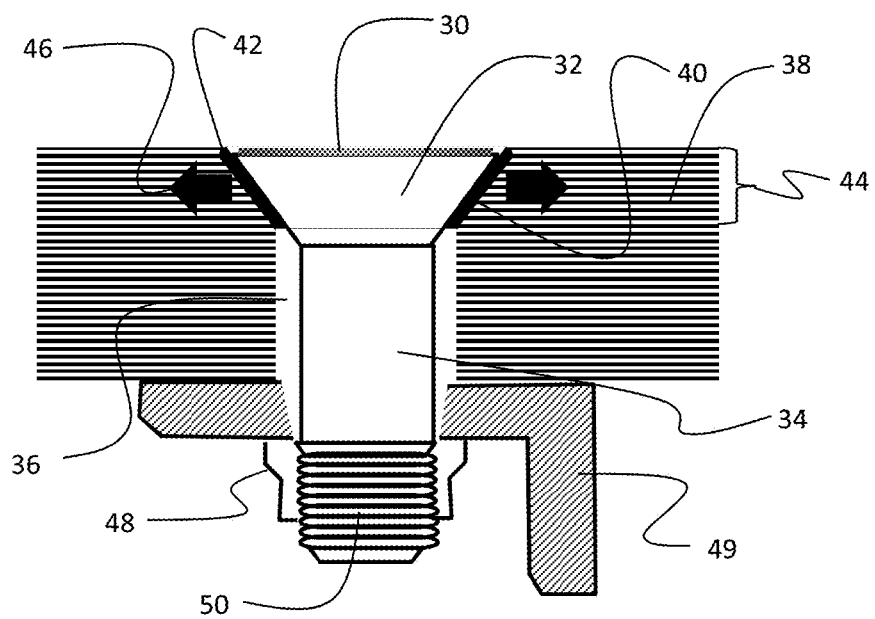
FIG. 2 is a section view of a first embodiment incorporating a conical washer for contact with a the top portion of a composite layup with a hole having clearance to accommodate a fastener shaft.

The first embodiment disclosed is shown in FIG. 2 wherein fastener 30 having a head 32 and shaft 34 is received in a countersunk hole 36 in a CFRP composite structure 38 such as a wing skin. A clearance fit is provided between the shaft 34 and hole 36. An angled countersink 40 in the hole 36 provides a mating surface having an angle concentric with the fastener head 32. A conical washer 42 is engaged between the head 32 and the countersink 40 providing electrical contact between the head and an outer portion 44 of the composite structure 38. This intimate electrical contact dissipates any electrical current conducting through the head 32 of the fastener 30 in a discharge path (represented by arrows 46) primarily through the composite layers in the outer portion 44 of the composite structure extending adjacent from the fastener head. The clearance fit of the shaft 34 and hole 36 encourages this discharge path through lower conductive contact between the shaft and composite structure. For the exemplary embodiment, the fastener 30 is secured with a nut/collar 48, or a nut with separate washer, received on a threaded end 50 to secure the composite structure 38 to another structural member 49. With the induced current path, there is negligible current density at the fastener collar or nut which reduces fuel tank sealing requirements as the means to contain outgassing energy from the fastened joint.

In the exemplary embodiment, the conical washer 42, countersink in the hole 36 and the head 32 have an angle of between 98° and 102°, nominally 100° and the conical washer has a thickness of between 0.001 and 0.005 inches. In an application with CFRP composite layers in the composite structure, a titanium fastener is employed and the conical washer is bare corrosion resistant steel (CRES) to provide the desired conductivity.

Figure 3E:
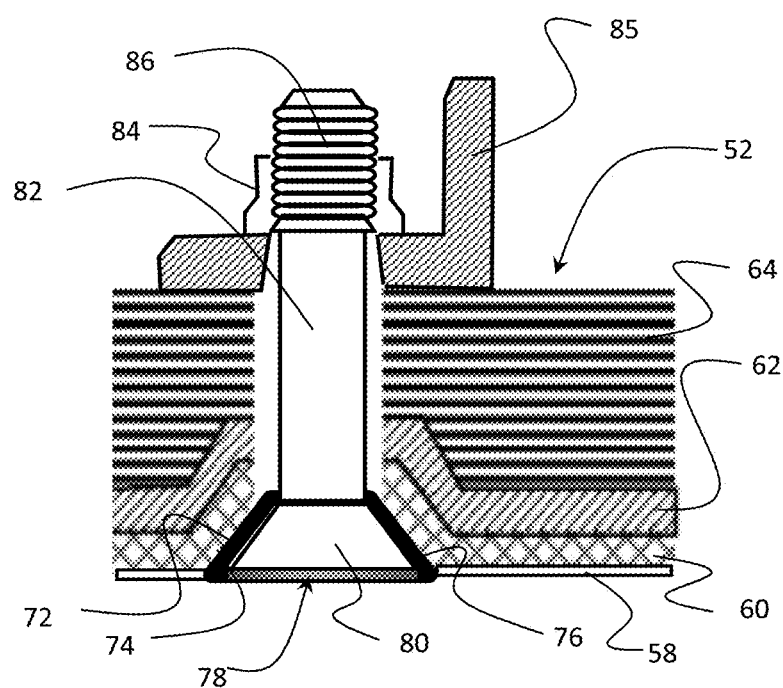
FIG. 3E shows a fragmentary view of the completed composite structural panel with a fastener inserted.

For the second disclosed embodiment, FIGS. 3A-3E illustrate a desired structure for an exemplary wing skin integral to a fuel tank in an aircraft. A multilayer composite structure 52 with integrated fastener-to-conductive layer surface protection interconnection is formed by employing a laminating tool 54, as seen in FIG. 3A, having a plurality of raised conical-shaped features or protrusions 56 positioned at desired fastener locations. A fiberglass or surfacing film layer 58 is placed on the tool to initiate the layup with the fiberglass or surfacing layer conforming to each of the conical shaped features 56. A conductive layer such as a wire mesh 60 is laid up over the fiberglass or surfacing film layer 58 with an outer surface 59 adjacent the fiberglass or surfacing film layer. For an exemplary embodiment the wire mesh layer is an expanded metal foil, such as copper, nickel or aluminum, with thickness ranging from 0.001 to 0.005 inch. An adhesive layer 62 is placed or applied over the wire mesh layer 60 and CFRP tape layers 64 for the composite structure such as an aircraft wing skin are laid up over an inner surface 61 of the wire mesh layer 60 covered by the adhesive layer. For the example embodiment the adhesive layer is epoxy based and has a film areal weight of 0.0200±0.0050 lb/ft2. In alternative embodiments, the adhesive layer 62 may be applied to the wire mesh layer 60 prior to layup with the other elements of the composite structure. Curing of the layup is then accomplished on the laminating tool 54.

The cured layup 66 seen in FIG. 3B is removed from the laminating tool 54. The layup provides preshaped conical chamfered recesses 68 corresponding to desired countersinks for fasteners at each of the desired locations. A plurality of holes 70 through which fasteners may be inserted are then drilled, finished or otherwise machined through the recesses 68 as seen in FIG. 3C. The fiberglass in the chamfered recesses 68 is then removed as shown in FIG. 3D leaving each chamfered recesses to expose the conductive surface 72 as conical countersinks 74 extending into an opening of each hole 70. The extension of the conductive layer into the recesses, provides an electrically conductive surface area in the countersink. For the embodiment shown, the chamfered recess results in parallel contact of the conductive layer over the entire length of the fastener head while the overall thickness of the wire mesh conductive layer spaced over the surface of the composite structure between the holes may remain thin for weight considerations. Accordingly, a multilayer composite structure with integrated fastener-to-conductive layer interconnection is provided, comprising a conductive layer having a plurality of chamfered recesses forming countersinks in an outer surface of the conductive layer, one or more carbon fiber reinforced plastic (CFRP) composite layers conforming to an inner surface of the conductive layer, and holes extending through the chamfered recesses in the conductive layer and the adjoining CFRP composite layer in a manner such that the conductive layer defines a countersink portion extending into openings of the holes. The chamfered recesses in the conductive layer thereby provide an electrically conductive surface area that enables electrical contact with electrically conductive countersunk fasteners that may be installed within the plurality of holes. Conical washers 76 may then be inserted into the countersinks 74.

As seen in FIG. 3E, the completed composite structure 52 with fasteners 78 installed provides conductive connection between the conical heads 80 of the fastener with the conical washers 76 which are intimately received within the conical countersinks 74 for direct connection to the conductive surface 72. In alternative embodiments, the conical washers 76 may be eliminated and the conical heads 80 of the fasteners 78 placed in direct contact with the conductive surface 72 in the conical countersinks 74. Shafts 82 of the fasteners 78 are received in the holes 70 with a clearance fit. For the embodiment shown, the fasteners 78 are secured with a nuts/collar 84 or received on threaded ends 86 of the shafts 82 to secure the composite structure 52 to another structural member 85. The clearance fit of the shaft 82 and hole 70 encourages current transition at the fastener head through higher resistance between the shaft and composite structure. With the induced current path through the conductive layer near the fastener head, there is negligible current density at the fastener collar or nut which reduces fuel tank sealing requirements.

Figure 4:
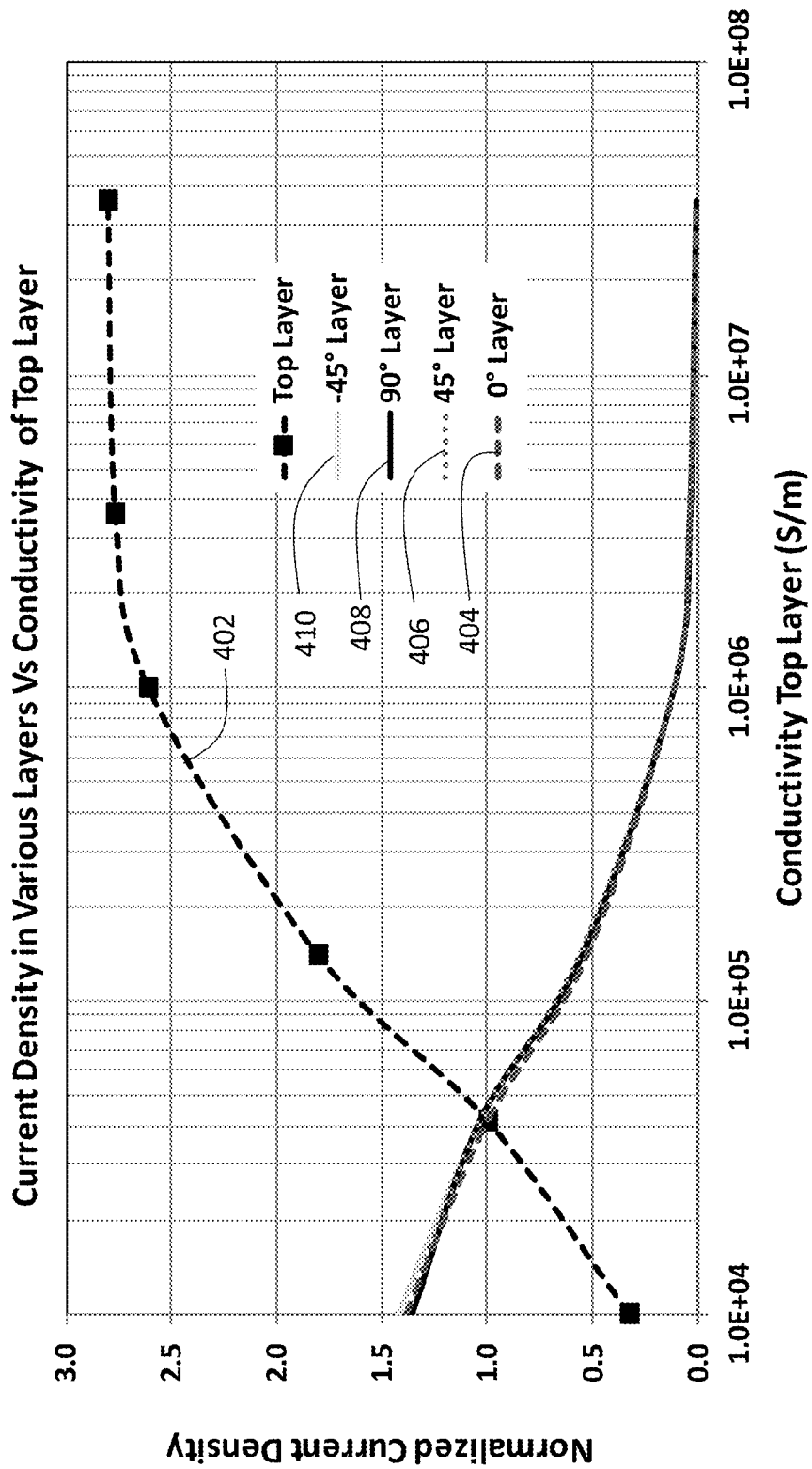
FIG. 4 is a graph showing current density in layers of a composite structure vs. conductivity of a top layer.

As seen in the graph provided in FIG. 4, for a composite structure having an outer layer with adjoining layers of CFRP composite in 0°, 45°, 90° and −45°, enhancing the conductivity of the top or outer layer in the composite structure having exposed fastener heads, as seen in trace 402, results in significantly reduced current density in inner composite layers as seen by traces 404, 406, 408 and 410. In the disclosed embodiment, the wire mesh layer 60 provides a conductivity of at least $10^5$ S/m. With the intimate conductive contact provided either directly from the conical head of the fasteners or through a conical washer into the chamfered surface of the countersink provided in the wire mesh surrounding each hole, any electrical discharge attaching the head of a fastener is dissipated primarily into the wire mesh layer of the composite structure further enhancing the phenomenon of inducing current density to remain in the outer layer with high conductivity in that outer layer.

Figure 5:
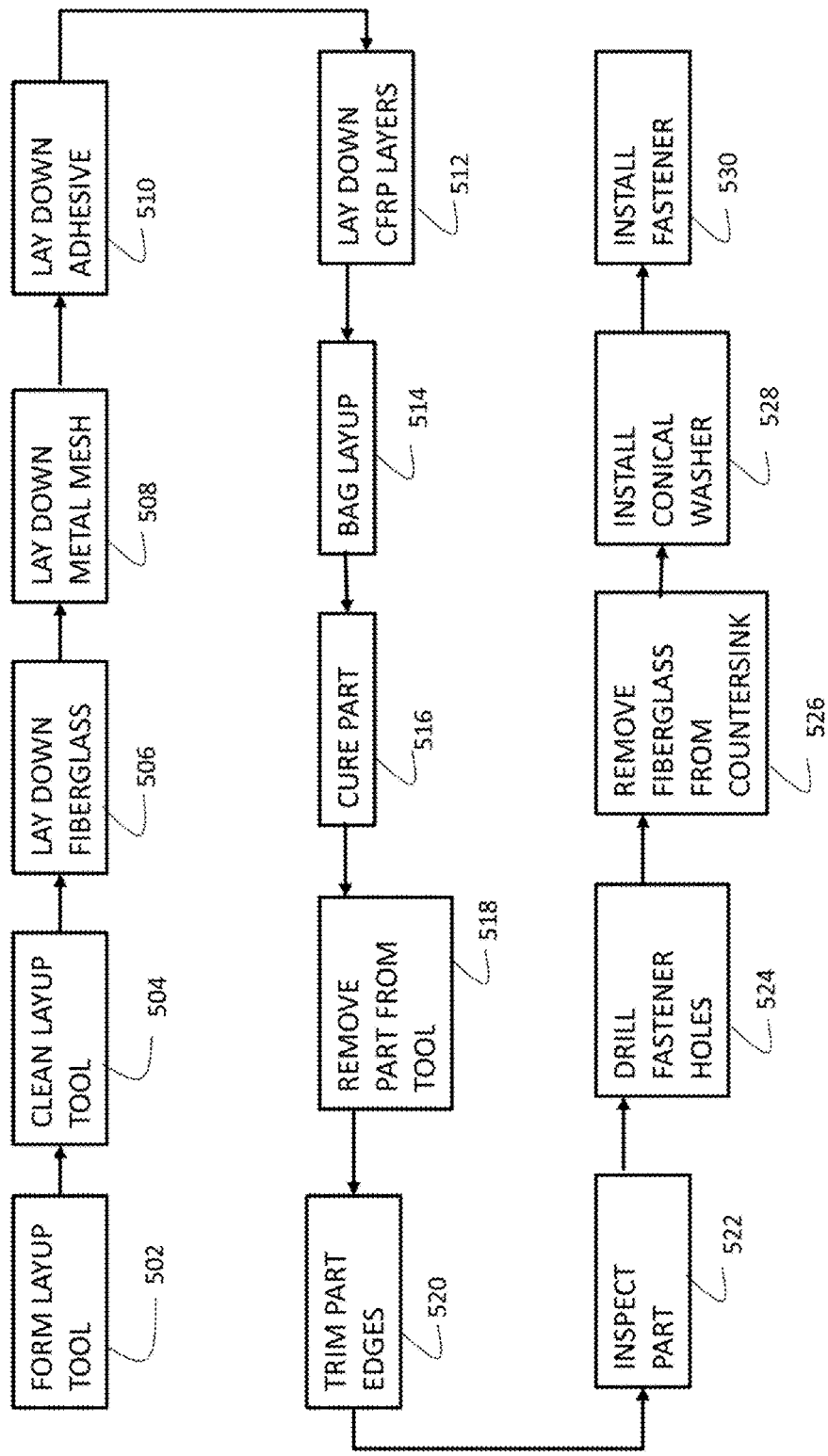
FIG. 5 is a flow chart showing a manufacturing method for the composite structural panel.

Fabrication of the multilayer composite structure with integrated fastener-to-conductive layer surface lightning protection interconnection may be accomplished with a method illustrated in FIG. 5. A tool is formed with a plurality of raised conical-shaped features, step 502, and the tool is cleaned, step 504. An outer protective layer of fiberglass or surfacing film is laid over the tool, step 506 and a conductive layer, wire mesh in an exemplary embodiment, is laid over the tool with the plurality of raised conical-shaped features forming a plurality of chamfered recesses in the wire-mesh conductive layer, step 508. An adhesive layer is laid over the wire-mesh conductive layer, step 510, or alternatively may be applied to the conductive layer prior to layup. Carbon-fiber reinforced plastic (CFRP) composite layers are laid over the integrated conductive layer/adhesive layer conforming to the shape of the conductive layer and tool, step 512. The layup is then bagged, step 514. The CFRP and conductive layer are co-cured as part of the layup on the tool to create the desire part such as the wing skin, step 516. The part is then removed from the tool, step 518, the edges trimmed, step 520, and the part inspected, step 522. A plurality of holes are machined through the plurality of recesses in the conductive layer and the adjoining composite layer in a manner such that the chamfered recesses in the conductive layer define countersinks extending into openings of the plurality of holes, step 524. Accordingly, a method is provided for forming a multilayer composite structure with integrated fastener-to-conductive layer interconnection, which includes laying a conductive layer over a tool having a plurality of raised conical-shaped features to form chamfered recesses in the conductive layer, laying at least one composite layer conforming to the conductive layer, co-curing the layers on the tool, and machining holes extending through the chamfered recesses in the conductive layer and the adjoining composite layer in a manner such that the chamfered recesses in the conductive layer define a countersink portions extending into the holes to expose a conductive surface of the conductive layer. The method further includes additional steps of inserting fasteners into the plurality of holes, where the chamfered recesses in the countersinks in the conductive layer electrically contact the conductive countersunk heads of the fasteners installed within the plurality of holes. The holes are sized to accommodate fasteners in a clearance fit. The countersink hole area is machined or finished to remove the fiberglass or other outer protective layer from the chamfered recesses, step 526. In alternative embodiments, other approaches such as laser ablation or plasma etch may be employed to remove the outer protective layer from the surface of the chamfered recesses. Fasteners are inserted into the plurality of holes, step 530, with conical heads of the fasteners engaging the chamfered recesses in the countersinks in conductive layer to increase the electrical contact surface area. A conical washer may be inserted into the chamfered recess in each hole, step 528, prior to inserting the fastener into the hole.

Figure 6:
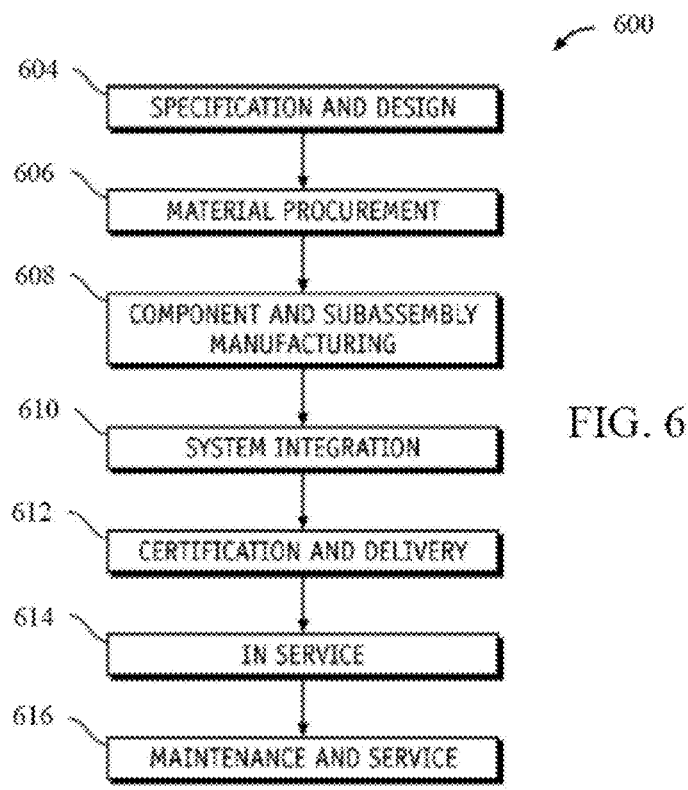
FIG. 6 is a flow chart depicting an aircraft manufacturing and service method in which the disclosed embodiments may be employed; and, FIG. 7 is a flow chart depicting an aircraft with which the disclosed embodiments may be employed.
Figure 7:
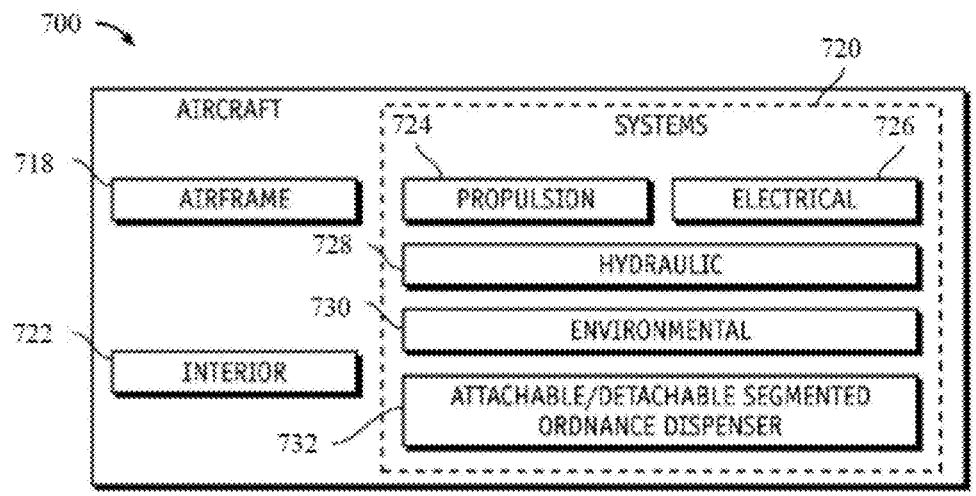

Embodiments of the disclosure may be described in the context of an aircraft manufacturing and service method 600 (method 600) as shown in FIG. 6 and an aircraft 700 as shown in FIG. 7. During pre-production, the exemplary method 600 may include specification and design 604 of the aircraft 700 and material procurement 606. During production, component and subassembly manufacturing 608 and system integration 610 of the aircraft 700 takes place. Thereafter, the aircraft 700 may go through certification and delivery 612 in order to be placed in service 614. While in service by a customer, the aircraft 700 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 7, the aircraft 700 produced by the exemplary method 600 may include an airframe 718 with a plurality of systems 720 and an interior 722. Examples of high-level systems 720 include one or more of a propulsion system 724, an electrical system 726, a hydraulic system 728, an environmental system 730, and an attachable/detachable segmented ordnance dispenser 732. Any number of other systems may also be included. Although an aerospace example is shown, the embodiments of the disclosure may be applied to other industries.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 700 is in service. In addition, one or more apparatus embodiments, method embodiments, or a combination thereof may be utilized during the production stages 608 and 610, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 616.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A multilayer composite structure with integrated fastener-to-conductive layer surface lightning protection interconnection comprising:
a conductive layer, with a plurality of preshaped conical chamfered recesses with inner and outer surfaces forming countersinks; and
one or more carbon fiber reinforced plastic (CFRP) composite layers disposed on and conforming to the inner surface of the plurality of preshaped conical chamfered recesses of the conductive layer; and
a plurality of holes extending through the plurality of chamfered recesses in the conductive layer and the adjoining CFRP composite layer in a manner such that each of the plurality of preshaped conical chamfered recesses in the conductive layer defines a countersink portion extending into openings of related holes in the plurality of holes,
whereby extension of the conductive layer into the preshaped conical chamfered recesses provide an electrically conductive surface area defining conical countersinks extending into each hole that contacts heads of conductive countersunk fasteners installed within the plurality of holes.

2. The multilayer composite structure with integrated fastener-to-conductive layer surface lightning protection interconnection as defined in claim 1 further comprising a fiberglass or surfacing film layer cocured over the outer surface of the conductive layer, said fiberglass or surfacing film layer removed from the preshaped conical chamfered recesses.

3. The multilayer composite structure with integrated fastener-to-conductive layer surface lightning protection interconnection as defined in claim 1 further comprising an adhesive layer integrated with the conductive layer between the conductive layer and the CFRP composite layer, said conductive layer, adhesive layer and the CFRP composite layer cocured on a shaped tool.

4. The multilayer composite structure with integrated fastener-to-conductive layer surface lightning protection interconnection as defined in claim 1 further comprising a plurality of conical washers inserted into the chamfered recesses.

5. The multilayer composite structure with integrated fastener-to-conductive layer surface lightning protection interconnection as defined in claim 4 wherein a conical head of each fastener conductively engages each conical washer.

6. The multilayer composite structure with integrated fastener-to-conductive layer surface lightning protection interconnection as defined in claim 1 wherein the conductive layer comprises a wire mesh.

7. The multilayer composite structure with integrated fastener-to-conductive layer surface lightning protection interconnection as defined in claim 6 wherein the wire mesh comprises an expanded metal foil, selected from the set of copper, nickel or aluminum.

8. The multilayer composite structure with integrated fastener-to-conductive layer surface lightning protection interconnection as defined in claim 7 wherein the expanded metal foil has thickness from 0.001 to 0.005 inch.

9. A multilayer composite structure with integrated fastener-to-conductive layer surface lightning protection interconnection comprising:
a conductive layer, with a plurality of preshaped conical chamfered recesses with inner and outer surfaces forming countersinks; and
one or more carbon fiber reinforced plastic (CFRP) composite layers disposed on and conforming to the inner surface of the plurality of preshaped conical chamfered recesses of the conductive layer; and
a plurality of holes extending through the plurality of chamfered recesses in the conductive layer and the adjoining CFRP composite layer in a manner such that each preshaped conical chamfered recesses in the conductive layer defines a countersink portion extending into openings of the plurality of holes, wherein the plurality of holes are sized to receive shafts of a plurality of fasteners in a clearance fit;
whereby the preshaped conical chamfered recesses in the conductive layer provide an electrically conductive surface area that contacts heads of conductive countersunk fasteners installed within the plurality of holes, said clearance fit of the shafts and holes encouraging current transition at the heads of the conductive countersunk fasteners to the conductive layer through higher resistance due to the clearance fit between the shafts and composite layers adjacent the shafts.

10. An integrated fastener surface lightning protection interconnection comprising:
a carbon fiber reinforced plastic (CFRP) composite structure having a hole with a countersink;
a conical washer inserted in the countersink wherein the conical washer has a thickness of 0.001 to 0.005 inch; and:
a fastener received with a clearance fit in the hole, a conical head of the fastener conductively engaging the conical washer wherein the fastener head is titanium and the conical washer is corrosion resistant steel (CRES) whereby any electrical discharge attaching to the head of the fastener is dissipated in a discharge path primarily through the composite layers in an outer portion of the composite structure extending adjacent from the fastener head.

11. A method of forming a multilayer composite structure with integrated fastener-to-conductive layer surface lightning protection interconnection comprising the steps of:
   laying a conductive layer over a tool having a plurality of raised conical-shaped features, to form a plurality of preshaped chamfered recesses in the conductive layer with inner and outer surfaces forming countersinks;
   laying at least one carbon-fiber reinforced plastic (CFRP) composite layer over the conductive layer conforming to the inner surface of the plurality of preshaped conical chamfered recesses of the conductive layer;
   cocuring the CFRP and conductive layer on the tool;
   machining a plurality of holes through the plurality of preshaped conical chamfered recesses in the conductive layer and the adjoining composite layer in a manner such that the preshaped conical chamfered recesses in the conductive layer define countersinks extending into openings of the plurality of holes and exposes a conductive surface of the conductive layer; and,
   inserting fasteners into the plurality of holes;
   wherein the extensions of the conductive layer into the preshaped conical chamfered recesses in the countersinks in the conductive layer provides an electrically conductive surface area defining conical countersinks extending into each hole that contacts the conductive countersunk heads of the fasteners installed within the plurality of holes.

12. The method as defined in claim 11 wherein the conductive layer comprises a wire mesh and further comprising laying an adhesive layer between the wire mesh and the at least one CFRP layer.

13. The method as defined in claim 12 wherein the wire mesh wherein the conical washer has a thickness of between 0.001 and 0.005 inches.

14. The method as defined in claim 11 further comprising inserting conical washers into the chamfered recesses prior to inserting the fasteners into the plurality of holes.

15. The method as defined in claim 11 wherein the step of machining a plurality of holes comprises machining a plurality of holes for clearance fit of fasteners.

16. A method of forming a multilayer composite structure with integrated fastener-to-conductive layer surface lightning protection interconnection comprising the steps of:
   laying a fiberglass layer on a tool having a plurality of raised conical-shaped features;
   laying a wire-mesh conductive layer over the fiberglass layer, to form a plurality of chamfered recesses in the wire-mesh conductive layer;
   laying at least one carbon-fiber reinforced plastic (CFRP) composite layer over the conductive layer;
   concuring the fiberglass layer, CFRP composite layer and conductive layer on the tool;
   machining a plurality of holes through the plurality of recesses in the conductive layer and the adjoining composite layer in a manner such that the chamfered recesses in the conductive layer define countersinks extending into openings of the plurality of holes and exposes a conductive surface of the conductive layer; and,
   inserting fasteners into the plurality of holes;
   wherein the chamfered recesses in the countersinks in the conductive layer electrically contacts the conductive countersunk heads of the fasteners installed within the plurality of holes.

17. A method of forming a multilayer composite structure with integrated fastener-to-conductive layer surface lightning protection interconnection comprising the steps of:
   forming a tool with a plurality of raised conical-shaped features having a chamfer angle of between 98° and 102°;
   laying a conductive layer over the tool to form a plurality of chamfered recesses in the conductive layer;
   laying at least one carbon-fiber reinforced plastic (CFRP) composite layer over the conductive layer;
   cocuring the CFRP and conductive layer on the tool;
   machining a plurality of holes through the plurality of recesses in the conductive layer and the adjoining composite layer in a manner such that the chamfered recesses in the conductive layer define countersinks extending into openings of the plurality of holes and exposes a conductive surface of the conductive layer; and,
   inserting fasteners into the plurality of holes;
   wherein the chamfered recesses in the countersinks in the conductive layer electrically contacts the conductive countersunk heads of the fasteners installed within the plurality of holes.

18. A method of forming a multilayer composite structure with integrated fastener-to-conductive layer surface lightning protection interconnection comprising the steps of:
   laying a conductive layer over the tool to form a plurality of chamfered recesses in the conductive layer;
   laying at least one carbon-fiber reinforced plastic (CFRP) composite layer over the conductive layer;
   cocuring the CFRP and conductive layer on the tool;
   machining a plurality of holes through the plurality of recesses in the conductive layer and the adjoining composite layer in a manner such that the chamfered recesses in the conductive layer define countersinks extending into openings of the plurality of holes and exposes a conductive surface of the conductive layer;
   inserting conical washers into the chamfered recesses wherein the conical washer has a thickness of between 0.001 and 0.005 inches;
   inserting fasteners into the plurality of holes;
   wherein the chamfered recesses in the countersinks in the conductive layer electrically contacts the conductive countersunk heads of the fasteners installed within the plurality of holes.

* * * * *